US009301081B1

(12) United States Patent
Callan et al.

(10) Patent No.: US 9,301,081 B1
(45) Date of Patent: Mar. 29, 2016

(54) DELIVERY OF OVERSIZED BRANDING ELEMENTS FOR CUSTOMIZATION

(71) Applicant: Sprint Communications Company L.P., Overland Park, KS (US)

(72) Inventors: Jeffrey S. Callan, Overland Park, KS (US); Dhananjay Indurkar, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 86 days.

(21) Appl. No.: 14/073,321

(22) Filed: Nov. 6, 2013

(51) Int. Cl.
   *H04W 4/00* (2009.01)
   *H04W 4/06* (2009.01)
   *H04W 4/08* (2009.01)
   *H04W 8/18* (2009.01)
   *H04W 8/20* (2009.01)
   *H04W 8/24* (2009.01)
   H04W 8/26 (2009.01)

(52) U.S. Cl.
   CPC ............. *H04W 4/001* (2013.01); *H04W 4/003* (2013.01); *H04W 4/06* (2013.01); *H04W 4/08* (2013.01); *H04W 8/18* (2013.01); *H04W 8/183* (2013.01); *H04W 8/20* (2013.01); *H04W 8/245* (2013.01); *H04W 8/265* (2013.01)

(58) Field of Classification Search
   None
   See application file for complete search history.

(56) References Cited

U.S. PATENT DOCUMENTS

| 6,131,024 | A | 10/2000 | Boltz |
| 6,445,914 | B1 * | 9/2002 | Findikli et al. ................. 455/411 |
| 6,753,887 | B2 | 6/2004 | Carolan et al. |
| 7,165,191 | B1 | 1/2007 | Vakrat |
| 7,260,382 | B1 * | 8/2007 | Lamb et al. .................. 455/411 |
| 7,266,371 | B1 | 9/2007 | Amin et al. |
| 7,493,111 | B2 | 2/2009 | Knowles |

(Continued)

FOREIGN PATENT DOCUMENTS

| GB | 2292047 A | 2/1996 |
| KR | 2006039974 A | 5/2006 |

(Continued)

OTHER PUBLICATIONS

Advisory Action dated Dec. 17, 2014, U.S. Appl. No. 13/622,234, filed Sep. 18, 2012.

(Continued)

*Primary Examiner* — King Poon
*Assistant Examiner* — Vincent Peren

(57) ABSTRACT

A mobile communication device. The device comprises a radio transceiver to communicatively couple the mobile communication device to a radio access network by a wireless communication link and a service pack. The device further comprises an application, as a component of the service pack, stored in the memory that, when executed by the processor at initial setup of the mobile communication device, determines whether a customization package exists on the mobile communication device, and if no customization package is present on the mobile communication device, selects a customization package from a pool of customization packages on a server based on predefined rules and downloads the selected customization package to the mobile communication device through any available communication link, wherein at least part of the selected customization package is downloaded through an alternative communication link other than an activation channel when the selected customization package is oversized for the activation channel.

17 Claims, 7 Drawing Sheets

(56) References Cited

U.S. PATENT DOCUMENTS

| | | | |
|---|---|---|---|
| 7,817,988 B2 | 10/2010 | Kruis et al. | |
| 7,904,895 B1 | 3/2011 | Cassapakis et al. | |
| 7,991,988 B2 | 8/2011 | Chen | |
| 8,107,926 B2 | 1/2012 | Goto | |
| 8,185,097 B2* | 5/2012 | Vanderlinden et al. | 455/418 |
| 8,185,101 B1 | 5/2012 | Wiseman et al. | |
| 8,249,654 B1 | 8/2012 | Zhu | |
| 8,260,281 B2 | 9/2012 | Urbanek | |
| 8,401,538 B2 | 3/2013 | Urbanek | |
| 8,401,595 B2 | 3/2013 | Zhu et al. | |
| 8,433,953 B1 | 4/2013 | Gaudette et al. | |
| 8,442,521 B2 | 5/2013 | Fleischman et al. | |
| 8,571,536 B2 | 10/2013 | Urbanek | |
| 8,612,967 B1 | 12/2013 | Delker | |
| 8,626,165 B1 | 1/2014 | Narasimhan et al. | |
| 8,666,383 B1 | 3/2014 | Mauer et al. | |
| 8,819,188 B2 | 8/2014 | Blatherwick et al. | |
| 8,825,039 B2 | 9/2014 | Mizuguchi | |
| 8,855,012 B1 | 10/2014 | Suri | |
| 8,909,291 B1 | 12/2014 | Spanel et al. | |
| 9,020,479 B1 | 4/2015 | Somayajula et al. | |
| 9,026,105 B2 | 5/2015 | Shipley et al. | |
| 9,042,877 B1 | 5/2015 | Ghoshal et al. | |
| 9,098,368 B1 | 8/2015 | Delker | |
| 9,100,769 B2 | 8/2015 | Annan et al. | |
| 9,100,819 B2 | 8/2015 | Annan et al. | |
| 9,125,037 B2 | 9/2015 | Masterson et al. | |
| 9,143,924 B1 | 9/2015 | Abou-El-Ella et al. | |
| 9,161,209 B1 | 10/2015 | Ghoshal et al. | |
| 9,161,325 B1 | 10/2015 | Urbanek | |
| 9,170,870 B1 | 10/2015 | Masterson et al. | |
| 9,198,027 B2 | 11/2015 | Urbanek | |
| 9,204,239 B1 | 12/2015 | Sumner | |
| 9,204,286 B1 | 12/2015 | Annan et al. | |
| 9,208,513 B1 | 12/2015 | Mauer et al. | |
| 9,226,133 B1 | 12/2015 | Spanel et al. | |
| 2002/0091931 A1 | 7/2002 | Quick, Jr. et al. | |
| 2003/0217145 A1 | 11/2003 | Leung et al. | |
| 2004/0033798 A1 | 2/2004 | Robin et al. | |
| 2004/0092248 A1 | 5/2004 | Kelkar et al. | |
| 2004/0093109 A1 | 5/2004 | O'Connor et al. | |
| 2004/0116163 A1 | 6/2004 | Kim et al. | |
| 2004/0137890 A1 | 7/2004 | Kalke | |
| 2004/0137891 A1 | 7/2004 | Clark et al. | |
| 2004/0261041 A1 | 12/2004 | Parakkuth et al. | |
| 2005/0079855 A1 | 4/2005 | Jethi et al. | |
| 2005/0085222 A1 | 4/2005 | Przybilski et al. | |
| 2005/0119001 A1 | 6/2005 | Watanabe | |
| 2005/0188262 A1 | 8/2005 | Rosenman et al. | |
| 2005/0197098 A1 | 9/2005 | Trossen | |
| 2006/0025151 A1 | 2/2006 | Karaoguz et al. | |
| 2006/0135144 A1 | 6/2006 | Jothipragasam | |
| 2006/0154651 A1 | 7/2006 | Knowles | |
| 2006/0203722 A1 | 9/2006 | Oommen | |
| 2006/0208071 A1 | 9/2006 | Chang et al. | |
| 2006/0235944 A1 | 10/2006 | Haslam | |
| 2006/0236325 A1* | 10/2006 | Rao et al. | 719/315 |
| 2006/0246949 A1 | 11/2006 | Gupta et al. | |
| 2007/0004404 A1 | 1/2007 | Buckley et al. | |
| 2007/0015538 A1* | 1/2007 | Wang | 455/558 |
| 2007/0082655 A1 | 4/2007 | Link et al. | |
| 2007/0099599 A1 | 5/2007 | Smith et al. | |
| 2007/0129057 A1 | 6/2007 | Xu et al. | |
| 2007/0130156 A1 | 6/2007 | U. Tenhunen et al. | |
| 2007/0165654 A1 | 7/2007 | Chai et al. | |
| 2007/0169084 A1 | 7/2007 | Frank et al. | |
| 2007/0190939 A1 | 8/2007 | Abel | |
| 2007/0197234 A1 | 8/2007 | Gill et al. | |
| 2007/0250645 A1 | 10/2007 | Meadows et al. | |
| 2007/0254635 A1 | 11/2007 | Montelius | |
| 2008/0039114 A1 | 2/2008 | Phatak et al. | |
| 2008/0046583 A1 | 2/2008 | Rao | |
| 2008/0046880 A1 | 2/2008 | Jun et al. | |
| 2008/0046997 A1 | 2/2008 | Wang | |
| 2008/0062900 A1 | 3/2008 | Rao | |
| 2008/0065753 A1 | 3/2008 | Rao | |
| 2008/0109662 A1 | 5/2008 | Natarajan et al. | |
| 2008/0146280 A1 | 6/2008 | Sasse et al. | |
| 2008/0155275 A1 | 6/2008 | Natarajan et al. | |
| 2008/0167027 A1 | 7/2008 | Gautier et al. | |
| 2008/0171532 A1 | 7/2008 | Shieh et al. | |
| 2008/0225806 A1 | 9/2008 | Arian et al. | |
| 2008/0281511 A1 | 11/2008 | Miyata | |
| 2008/0300967 A1 | 12/2008 | Buckley et al. | |
| 2008/0318547 A1 | 12/2008 | Ballou, Jr. et al. | |
| 2009/0061840 A1 | 3/2009 | Fleischman et al. | |
| 2009/0075592 A1 | 3/2009 | Nystrom et al. | |
| 2009/0093242 A1 | 4/2009 | Bhalekar et al. | |
| 2009/0094350 A1 | 4/2009 | Rive et al. | |
| 2009/0106200 A1 | 4/2009 | Salinas et al. | |
| 2009/0124250 A1 | 5/2009 | Topaltzas et al. | |
| 2009/0156190 A1 | 6/2009 | Fisher | |
| 2009/0156209 A1 | 6/2009 | Franklin et al. | |
| 2009/0239518 A1 | 9/2009 | Feuillette | |
| 2009/0247124 A1 | 10/2009 | de Atley et al. | |
| 2009/0260004 A1 | 10/2009 | Datta et al. | |
| 2009/0307763 A1 | 12/2009 | Rawlins et al. | |
| 2010/0048193 A1 | 2/2010 | Ortion et al. | |
| 2010/0060456 A1 | 3/2010 | Forster | |
| 2010/0075669 A1 | 3/2010 | Sparks et al. | |
| 2010/0080143 A1 | 4/2010 | Topaltzas et al. | |
| 2010/0133335 A1 | 6/2010 | Maguid et al. | |
| 2010/0136960 A1 | 6/2010 | Knezevic | |
| 2010/0159876 A1 | 6/2010 | Brown et al. | |
| 2010/0161724 A1 | 6/2010 | Sathyan et al. | |
| 2010/0167696 A1 | 7/2010 | Smith et al. | |
| 2010/0192120 A1 | 7/2010 | Raleigh | |
| 2010/0198939 A1 | 8/2010 | Raleigh | |
| 2010/0203864 A1 | 8/2010 | Howard | |
| 2010/0207742 A1 | 8/2010 | Buhot et al. | |
| 2010/0222031 A1 | 9/2010 | Carolan et al. | |
| 2010/0222047 A1 | 9/2010 | Vanderlinden et al. | |
| 2010/0262638 A1 | 10/2010 | Fitzgerald | |
| 2010/0291898 A1 | 11/2010 | Sanding et al. | |
| 2010/0311404 A1 | 12/2010 | Shi et al. | |
| 2010/0312794 A1 | 12/2010 | Liu | |
| 2010/0325622 A1 | 12/2010 | Morton | |
| 2010/0332639 A1 | 12/2010 | Diaz et al. | |
| 2011/0003590 A1 | 1/2011 | Yoon et al. | |
| 2011/0014913 A1 | 1/2011 | Yoon et al. | |
| 2011/0026501 A1 | 2/2011 | Sharaga et al. | |
| 2011/0028138 A1 | 2/2011 | Davies-Moore et al. | |
| 2011/0030062 A1 | 2/2011 | Hsu et al. | |
| 2011/0035421 A1 | 2/2011 | Laird-McConnell et al. | |
| 2011/0081885 A1 | 4/2011 | Sennett et al. | |
| 2011/0119716 A1 | 5/2011 | Coleman, Sr. | |
| 2011/0138074 A1 | 6/2011 | Onda et al. | |
| 2011/0161659 A1 | 6/2011 | Himawan et al. | |
| 2011/0165836 A1 | 7/2011 | Dixon et al. | |
| 2011/0173685 A1 | 7/2011 | Chai et al. | |
| 2011/0202680 A1* | 8/2011 | Bells et al. | 709/238 |
| 2011/0202976 A1 | 8/2011 | Chow et al. | |
| 2011/0208338 A1 | 8/2011 | Eteminan et al. | |
| 2011/0208865 A1 | 8/2011 | Knowles et al. | |
| 2011/0222404 A1 | 9/2011 | Watson et al. | |
| 2011/0230136 A1 | 9/2011 | Washiro | |
| 2011/0258249 A1 | 10/2011 | Biggs et al. | |
| 2011/0263294 A1 | 10/2011 | Kim et al. | |
| 2011/0294484 A1 | 12/2011 | Martin et al. | |
| 2011/0296399 A1 | 12/2011 | Tugnawat et al. | |
| 2011/0306318 A1 | 12/2011 | Rodgers et al. | |
| 2011/0314129 A1 | 12/2011 | Rezaiifar et al. | |
| 2012/0027059 A1 | 2/2012 | Zhao et al. | |
| 2012/0035989 A1* | 2/2012 | Abel et al. | 705/14.1 |
| 2012/0036282 A1 | 2/2012 | Chen et al. | |
| 2012/0046022 A1 | 2/2012 | Kalke et al. | |
| 2012/0047227 A1 | 2/2012 | Haggerty et al. | |
| 2012/0094684 A1 | 4/2012 | Reddy | |
| 2012/0106509 A1 | 5/2012 | Klingenbrunn et al. | |
| 2012/0129513 A1 | 5/2012 | van der Laak | |
| 2012/0129572 A1 | 5/2012 | Johnstone et al. | |
| 2012/0135733 A1 | 5/2012 | Cormier et al. | |
| 2012/0142327 A1* | 6/2012 | Urbanek | 455/418 |
| 2012/0158580 A1 | 6/2012 | Eram et al. | |

(56) References Cited

U.S. PATENT DOCUMENTS

| | | | |
|---|---|---|---|
| 2012/0203824 | A1 | 8/2012 | Oommen |
| 2012/0208511 | A1 | 8/2012 | Vanderlinden et al. |
| 2012/0230587 | A1 | 9/2012 | Arseneau |
| 2012/0260095 | A1 | 10/2012 | Von Hauck et al. |
| 2012/0276872 | A1 | 11/2012 | Knauth et al. |
| 2012/0282891 | A1 | 11/2012 | Mohammed et al. |
| 2012/0282924 | A1 | 11/2012 | Tagg et al. |
| 2013/0010641 | A1 | 1/2013 | Dinan |
| 2013/0023235 | A1 | 1/2013 | Fan et al. |
| 2013/0031191 | A1 | 1/2013 | Bott |
| 2013/0031234 | A1 | 1/2013 | Alfano et al. |
| 2013/0041988 | A1 | 2/2013 | Rodermund et al. |
| 2013/0046951 | A1 | 2/2013 | Jones |
| 2013/0065578 | A1 | 3/2013 | Raleigh et al. |
| 2013/0072168 | A1 | 3/2013 | Colucciello et al. |
| 2013/0085914 | A1 | 4/2013 | McPherson et al. |
| 2013/0111461 | A1 | 5/2013 | Zubas et al. |
| 2013/0196647 | A1 | 8/2013 | Raleigh et al. |
| 2013/0198567 | A1 | 8/2013 | Ahmed Istiak et al. |
| 2013/0222395 | A1 | 8/2013 | Blas, Jr. |
| 2013/0303142 | A1 | 11/2013 | Burcham et al. |
| 2013/0310003 | A1 | 11/2013 | Sadhvani Rita et al. |
| 2013/0311836 | A1 | 11/2013 | Hurst Cameron et al. |
| 2014/0045483 | A1 | 2/2014 | Whidden |
| 2014/0075567 | A1 | 3/2014 | Raleigh et al. |
| 2014/0080467 | A1 | 3/2014 | Urbanek |
| 2014/0099916 | A1 | 4/2014 | Mallikarjunan et al. |
| 2014/0113610 | A1 | 4/2014 | Ramprasad Satish et al. |
| 2014/0206313 | A1 | 7/2014 | Spanel et al. |
| 2014/0228012 | A1 | 8/2014 | Annan et al. |
| 2014/0228042 | A1 | 8/2014 | Annan et al. |
| 2014/0274032 | A1 | 9/2014 | Shipley et al. |
| 2014/0342715 | A1 | 11/2014 | Gu et al. |
| 2014/0373184 | A1 | 12/2014 | Mahaffey |
| 2015/0017962 | A1 | 1/2015 | Howard et al. |
| 2015/0065105 | A1 | 3/2015 | Masterson |
| 2015/0111564 | A1 | 4/2015 | Urbanek |
| 2015/0111565 | A1 | 4/2015 | Urbanek |

FOREIGN PATENT DOCUMENTS

| | | | |
|---|---|---|---|
| WO | WO2012078753 | A1 | 6/2012 |
| WO | WO2013169983 | A1 | 11/2013 |
| WO | WO2014046814 | A1 | 3/2014 |
| WO | WO2014113128 | A1 | 7/2014 |
| WO | WO2014123758 | A1 | 8/2014 |
| WO | WO2014123759 | A1 | 8/2014 |
| WO | WO2014158430 | A1 | 9/2014 |
| WO | WO2015030945 | A1 | 3/2015 |
| WO | WO2015060965 | A2 | 4/2015 |

OTHER PUBLICATIONS

Notice of Allowance dated Nov. 22, 2014, U.S. Appl. No. 13/744,861, filed Jan. 18, 2013.
First Action Interview Pre-Interview Communication dated Oct. 22, 2014, U.S. Appl. No. 13/763,428, filed Feb. 8, 2013.
Notice of Allowance dated Dec. 29, 2014, U.S. Appl. No. 13/831,504, filed Mar. 14, 2013.
First Action Interview Pre-Interview Communication dated Nov. 20, 2014, filed on May 21, 2013.
Foreign Communication from a Related Counterpart Application, "Preliminary Report on Patentability," dated Nov. 20, 2014, PCT/US13/40278 filed on May 9, 2013.
Foreign Communication from a Related Counterpart—International Search Report and Written Opinion, dated Dec. 17, 2014, PCT/US14/46773, filed on Jul. 16, 2014.
Foreign Communication from a Related Counterpart—International Search Report and Written Opinion, dated Dec. 30, 2014, PCT/US14/56778, filed Sep. 22, 2014.
Spanel, Robert L., et al., Patent Application entitled "Dynamic Remotely Managed SIM Profile" U.S. Appl. No. 14/522,586, filed Oct. 24, 2014.
Urbanek, Robert E, "Delivery of Branding Content and Customizations to a Mobile Communication Device", filed Sep. 22, 2014, International Serial No. PCT/US14/56778.
Koller, Gary D., et al., "Out of the Box Experience (OOBE) Country Choice Using Wi-Fi Layer Transmission," filed Oct. 31, 2014, U.S. Appl. No. 14/530,666.
Blinn, Benjamin P., et al. "System and Method of Efficient Mobile Device Network Brand Customization," filed Sep. 2, 2014, U.S. Appl. No. 14/475,399.
FAIPP Pre-Interview Communication dated Jun. 2, 2015, U.S. Appl. No. 14/152,627, filed Jan. 10, 2013.
Notice of Allowance dated Jul. 7, 2015, U.S. Appl. No. 14/522,586, filed Oct. 24, 2014.
FAIPP Pre-Interview Communication dated Apr. 23, 2014, U.S. Appl. No. 13/763,443, filed Feb. 8, 2013.
First Action Interview Office Action dated Jun. 16, 2014, U.S. Appl. No. 13/763,443, filed Feb. 8, 2013.
Office Action dated Jun. 16, 2015, U.S. Appl. No. 13/899,567, filed May 22, 2013.
Notice of Allowance dated May 7, 2015, U.S. Appl. No. 13/972,827, filed Aug. 21, 2013.
Notice of Allowance dated May 29, 2015, U.S. Appl. No. 14/085,474, filed Nov. 20, 2013.
Notice of Allowance dated May 8, 2015, U.S. Appl. No. 14/010,518, filed Aug. 27, 2013.
Notice of Allowance dated Jul. 8, 2015, U.S. Appl. No. 14/010,522, filed Aug. 27, 2013.
Notice of Allowance dated Jun. 26, 2015, U.S. Appl. No. 14/010,523, filed Aug. 27, 2013.
Notice of Allowance dated Apr. 28, 2015, U.S. Appl. No. 14/010,524, filed Aug. 27, 2013.
FAIPP Pre-Interview Communication dated Jul. 8, 2015, U.S. Appl. No. 14/475,399, filed Sep. 2, 2014.
Amazon Kindle e-book reader, on public sale 2007, http://en.wikipedia.org/wiki/Amazon_Kindle.last accessed on Apr. 13, 2015.
First Action Interview Office Action dated Mar. 16, 2015, U.S. Appl. No. 13/468,028, filed May 9, 2013.
Office Action dated Mar. 2, 2015, U.S. Appl. No. 13/622,234, filed Sep. 18, 2012.
FAIPP Pre-Interview Communication dated Mar. 26, 2015, U.S. Appl. No. 14/522,586, filed Oct. 24, 2014.
FAIPP Pre-Interview Communication dated Apr. 8, 2015, U.S. Appl. No. 13/844,104, filed Mar. 15, 2013.
Notice of Allowance dated Mar. 20, 2015, U.S. Appl. No. 13/763,428, filed Feb. 8, 2013.
Notice of Allowance dated Mar. 26, 2015, U.S. Appl. No. 13/763,434, filed Feb. 8, 2013.
Notice of Allowance dated Jan. 22, 2015, U.S. Appl. No. 13/899,566, filed May 21, 2013.
FAIPP Pre-Interview Communication dated Apr. 15, 2015, U.S. Appl. No. 14/060,712, filed Nov. 20, 2013.
FAIPP Pre-Interview Communication dated Mar. 4, 2015, U.S. Appl. No. 14/010,518, filed Aug. 27, 2013.
FAIPP Pre-Interview Communication dated Apr. 1, 2015, U.S. Appl. No. 14/010,522, filed Aug. 27, 2013.
FAIPP Pre-Interview Communication dated Apr. 3, 2015, U.S. Appl. No. 14/010,523, filed Aug. 27, 2013.
FAIPP Pre-Interview Communication dated Mar. 10, 2015, U.S. Appl. No. 14/010,524, filed Aug. 27, 2013.
FAIPP Pre-Interview Communication dated Apr. 8, 2015, U.S. Appl. No. 14/157,507, filed Jan. 16, 2014.
Foreign Communication from a Related Counterpart—International Preliminary Report on Patentability, dated Apr. 2, 2015, PCT/US13/55023, filed on Aug. 15, 2013.
Delker, Jason R., et al. "Subscriber Identity Module (SIM) Card Initiation of Custom Application Launcher Installation on a Mobile Communication Device," filed Mar. 4, 2015, U.S. Appl. No. 14/639,056.
Delker, Jason R., et al. "Network Access Tiered Based on Application Launcher Installation," filed Mar. 4, 2015, U.S. Appl. No. 14/639,060.
FAIPP Pre-Interview Communication dated Mar. 12, 2015, U.S. Appl. No. 13/972,827, filed Aug. 21, 2013.

(56) References Cited

OTHER PUBLICATIONS

Ghoshal, Jagannath, et al., "Multi-Step Mobile Device Initiation with Intermediate Partial Reset," filed Aug. 21, 2013, U.S. Appl. No. 13/972,827.
Notice of Allowance dated Apr. 26, 2012, U.S. Appl. No. 12/962,620, filed Dec. 7, 2010.
Notice of Allowance dated Nov. 2, 2012, U.S. Appl. No. 13/556,202, filed Jul. 24, 2012.
Notice of Allowance dated Jun. 11, 2013, U.S. Appl. No. 13/752,386, filed Jan. 28, 2013.
First Action Interview Pre-Interview Communication dated Feb. 25, 2013, U.S. Appl. No. 13/149,505, filed May 31, 2013.
First Action Interview Office Action dated May 8, 2013, U.S. Appl. No. 13/149,505, filed May 31, 2013.
Notice of Allowance dated Aug. 9, 2013, U.S. Appl. No. 13/149,505, filed May 31, 2013.
First Action Interview Pre-Interview Communication dated Aug. 13, 2013, U.S. Appl. No. 13/335,941, filed Dec. 23, 2011.
Notice of Allowance dated Oct. 9, 2013, U.S. Appl. No. 13/335,941, filed Dec. 23, 2011.
First Action Interview Pre-Interview Communication dated Apr. 23, 2014, U.S. Appl. No. 13/622,234, filed Sep. 18, 2012.
Final Office Action dated Sep. 19, 2014, U.S. Appl. No. 13/622,234, filed Sep. 18, 2012.
FAIPP Pre-Interview Communication dated Mar. 19, 2014, U.S. Appl. No. 13/744,847, filed Jan. 18, 2013.
Notice of Allowance dated Aug. 4, 2014, U.S. Appl. No. 13/744,847, filed Jan. 18, 2013.
FAIPP Pre-Interview Communication dated Jul. 16, 2014, U.S. Appl. No. 13/744,861, filed Jan. 18, 2013.
First Action Interview Pre-Interview Communication dated Apr. 3, 2014, U.S. Appl. No. 13/763,434, filed Feb. 8, 2013.
Final Office Action dated Aug. 19, 2014, U.S. Appl. No. 13/763,434, filed Feb. 8, 2013.
Office Action dated Aug. 7, 2014, U.S. Appl. No. 13/831,504, filed Mar. 14, 2013.
Foreign Communication from a Related Counterpart—International Search Report and Written Opinion, dated Feb. 29, 2012, PCT/US2011/063736, filed on Dec. 7, 2011.
Foreign Communication from a Related Counterpart Application, "Preliminary Report on Patentability", dated Jun. 20, 2013, PCT/US2011/063736 filed on Dec. 7, 2011.
Foreign Communication from a Related Counterpart—International Search Report and Written Opinion, dated Jul. 24, 2013, PCT/US13/40278, filed on May 9, 2013.
Foreign Communication from a Related Counterpart—International Search Report and Written Opinion, dated Nov. 14, 2013, PCT/US13/55023, filed on Aug. 15, 2013.
Foreign Communication From a Related Counterpart Application, International Search Report and Written Opinion dated Jan. 24, 2014, International Application No. PCT/US13/68981 filed on Nov. 7, 2013.
Foreign Communication from a Related Counterpart—International Search Report and Written Opinion, dated May 19, 2014, PCT/US14/13936, filed on Jan. 30, 2014.
Foreign Communication from a Related Counterpart—International Search Report and Written Opinion, dated May 14, 2014, PCT/US14/13939, filed on Jan. 30, 2014.
Delker, Jason R., "Loading Branded Media Outside System Partition", filed Oct. 30, 2013 U.S. Appl. No. 14/066,947.
Mauer, Brian D., et al., "Automatic Branding of Generic Applications", filed Jan. 10, 2013, U.S. Appl. No. 14/152,627.
Spanel, Robert L., et al., Patent Application entitled "Dynamic Remotely Managed SIM Profile" U.S. Appl. No. 13/744,847, filed Jan. 18, 2013.
Annan, Brandon C., et al.,"System and Method of Branding and Labeling a Mobile Device", filed Mar. 15, 2013, U.S. Appl. No. 13/844,104.
Annan, Brandon C., et al.,"Electronic Fixed Brand Labeling", filed Feb. 8, 2013, U.S. Appl. No. 13/763,443.
Ghoshal, Jagannath, et al.,"Rebranding a Portable Electronic Device While Maintaining User Data", filed May 22, 2013, U.S. Appl. No. 13/899,567.
Ghoshal, Jagannath, et al.,"System and Method for Retrofitting a Branding Framework into a Mobile Communication Device", filed May 21, 2013, U.S. Appl. No. 13/899,566.
Urbanek, Robert E., "Delivery of Branding Content and Customizations to a Mobile Communication Device", filed Oct. 23, 2013, U.S. Appl. No. 14/060,712.
Urbanek, Robert E., "Implementation of Remotely Hosted Branding Content and Customizations", filed Oct. 23, 2013, U.S. Appl. No. 14/085,474.
Urbanek, Robert E., "Subscriber Identity Module Virtualization", filed Nov. 20, 2013, U.S. Appl. No. 14/060,719.
Indurkar, Dhananjay, "System and Method of Branding a Device Independent of Device Activation", filed Jan. 24, 2014, U.S. Appl. No. 14/163,035.
Sumner, Bret D., "Directing Server Connection Based on Location Identifier", filed Aug. 15, 2013, U.S. Appl. No. 13/968,259.
Abou-El-Ella, Hassan, et al., "Segmented Customization Payload Delivery", filed Aug. 27, 2013, U.S. Appl. No. 14/010,518.
Sumner, Bret D., "Segmented Customization Package Within Distributed Server Architecture", filed Aug. 27, 2013, U.S. Appl. No. 14/010,522.
Masterson, Michelle E., et al., "Development and Testing of Payload Receipt by a Portable Electronic Device", filed Aug. 27, 2013, U.S. Appl. No. 14/010,523.
Masterson, Michelle E., et al., "System and Methods for Deferred and Remote Device Branding", filed Aug. 27, 2013, U.S. Appl. No. 14/010,524.
Masterson, Michelle E., et al., "System and Methods for Deferred and Remote Device Branding", filed Jul. 16, 2014, International Serial No. PCT/US14/46773.
Indurkar, Dhananjay, "Background Delivery of Device Configuration and Branding", filed Jan. 16, 2014, U.S. Appl. No. 14/157,507.
Ahn, Chul Jin, et al., "Separation of Client Identification Composition from Customization Payload to Original Equipment Manufacturer Layer", filed Nov. 8, 2013, U.S. Appl. No. 14/075,687.
Ghoshal, Jagannath, et al., "Multiple Carrier Partition Dynamic Access on a Mobile Device", filed Jun. 5, 2014, U.S. Appl. No. 14/297,429.
Indurkar, Dhananjay, "Activation Sequence Using Permission Based Connection to Network", filed Jan. 24, 2014, U.S. Appl. No. 14/163,041.
Ahn, Chul Jin, et al., "Customization for Preloaded Applications", filed Mar. 31, 2014, U.S. Appl. No. 14/231,718.
First Action Interview Pre-Interview Communication dated Sep. 22, 2014, U.S. Appl. No. 13/468,028, filed May 9, 2013.
Foreign Communication from a Related Counterpart—International Search Report and Written Opinion, dated Jun. 3, 2014,PCT/US14/16650, filed on Feb. 16, 2014.
Urbanek, Robert E., "Delivery of Branding Content and Customizations to a Mobile Communication Device", filed , 201, International Serial No. PCT/US14/56778.
Foreign Office Action dated Jul. 7, 2015, Japanese Application Serial No. 2013-543310, filed Jul. 7, 2015.
Notice of Allowance dated Aug. 6, 2015, U.S. Appl. No. 14/152,627, filed Jan. 10, 2013.
Notice of Allowance dated Jul. 15, 2015, U.S. Appl. No. 13/622,234, filed Sep. 18, 2012.
Notice of Allowance dated Jul. 16, 2015, U.S. Appl. No. 13/844,104, filed Mar. 15, 2013.
Final Office Action dated Aug. 10, 2015, U.S. Appl. No. 13/763,443, filed Feb. 8, 2013.
FAIPP Pre-Interview Communication dated Sep. 29, 2015, U.S. Appl. No. 14/163,035, filed Jan. 24, 2014.
FAIPP Pre-Interview Communication dated Jul. 15, 2015, U.S. Appl. No. 14/163,041, filed Jan. 24, 2014.
FAIPP Pre-Interview Communication dated Sep. 21, 2015, U.S. Appl. No. 14/231,718, filed Mar. 31, 2014.
Foreign Communication From a Related Counterpart Application, International Preliminary Report on Patentability dated Jul. 30, 2015, PCT/US13/68981, filed on Nov. 7, 2013.

(56) References Cited

OTHER PUBLICATIONS

Foreign Communication From a Related Counterpart Application, International Preliminary Report on Patentability dated Aug. 20, 2015, PCT/US14/13936, filed on Jan. 30, 2014.
Foreign Communication From a Related Counterpart Application, International Preliminary Report on Patentability dated Aug. 20, 2015, PCT/US14/13939, filed on Jan. 30, 2014.
Foreign Communication From a Related Counterpart Application, International Preliminary Report on Patentability dated Sep. 24, 2015, PCT/US14/16650, filed on Feb. 16, 2014.
Dummies, "Power Modes on Your Kindle Paperwhite", http://dummies.com/how-to/content/power-modes-on-your-kindle-paperwhite.html, last accessed on Jul. 31, 2015.
Cushings, "Buy Your Kindle At Waterstones? You're Now Locked Into One Sceensaver . . . The Waterstones Logo", https://www.techdirt.com/articles/20121206/16014421285/buy-your-kindle-waterstones-youre-now-locked-into-one-screen-saver-waterstones-logo.shtml, last accessed Aug. 3, 2015.
Wikipedia, Extended Display Identification Data, https://en.wikipedia.org/wiki/Extended_Display_identification_Data, last accessed Aug. 5, 2015.
Final Office Action dated Nov. 4, 2015, U.S. Appl. No. 13/468,028, filed May 9, 2012.
Advisory Action dated Nov. 3, 2015, U.S. Appl. No. 13/763,443, filed Feb. 8, 2013.
Notice of Allowance dated Oct. 26, 2015, U.S. Appl. No. 13/899,567, filed May 22, 2013.
FAIPP Pre-Interview Communication dated Oct. 16, 2015, U.S. Appl. No. 14/060,712, filed Oct. 23, 2013.
FAIPP Pre-Interview Communication dated Nov. 2, 2015, U.S. Appl. No. 14/060,719, filed Oct. 23, 2013.
First Action Interview Office Action dated Dec. 14, 2015, U.S. Appl. No. 14/060,719, filed Oct. 23, 2013.
First Action Interview Office Action dated Oct. 16, 2015, U.S. Appl. No. 14/157,507, filed on Jan. 16, 2014.
FAIPP Pre-Interview Communication dated Oct. 7, 2015, U.S. Appl. No. 14/075,687, filed Nov. 8, 2013.
FAIPP Pre-Interview Communication dated Nov. 19, 2015, U.S. Appl. No. 14/297,429, filed Jun. 5, 2014.
Notice of Allowance dated Dec. 4, 2015, U.S. Appl. No. 14/475,399, filed Sep. 2, 2014.
Supplemental Notice of Allowability dated Dec. 14, 2015, U.S. Appl. No. 14/475,399, filed Sep. 2, 2014.
Urbanek, Robert E., "Generic Mobile Devices Customization Framework," filed Oct. 7, 2015, U.S. Appl. No. 14/877,215.
FAIPP Pre-Interview Communication dated Nov. 4, 2015, U.S. Appl. No. 14/619,677, filed Feb. 11, 2015.
Notice of Allowance dated Dec. 11, 2015, U.S. Appl. No. 14/619,677, filed Feb. 11, 2015.

\* cited by examiner

DELIVERY OF OVERSIZED BRANDING ELEMENTS FOR CUSTOMIZATION

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Mobile telephones are electronic devices that are used for mobile voice and/or data communications based on wireless network connectivity, which can be provided by base stations known as cell towers or sites. Such electronic devices may be associated with an electronic serial number (ESN), a stock keeping unit (SKU) number, and other identifying information. Mobile telephones and similar electronic/communications devices may be packaged with operating manuals, warning documents, charging devices, and other accessories in a point-of-sale package suitable for distributing to end users. A plurality of point-of-sale packages, each containing an electronic device, may be shipped together to a retail store or business location. Electronic devices may be configured prior to shipping with unique packaging, hardware and software branding, features and functionality.

SUMMARY

In an embodiment, a mobile communication device is disclosed. The device comprises a radio transceiver to communicatively couple the mobile communication device to a radio access network by a wireless communication link, a memory, a processor, and a service pack. The device further comprises an application, as a component of the service pack, stored in the memory that, when executed by the processor at initial setup of the mobile communication device, determines whether a customization package exists on the mobile communication device, and if no customization package is present on the mobile communication device, selects a customization package from a pool of customization packages on a server based on predefined rules and downloads the selected customization package to the mobile communication device through any available communication link, wherein at least part of the selected customization package is downloaded through an alternative communication link other than an activation channel when the selected customization package is oversized for the activation channel. The application then finds the relevant components in the customization package, installs the relevant components in the memory, and utilizes the relevant components.

In an embodiment, a method of delivering oversized branding elements for customization on a mobile communication device is disclosed. The method comprises executing instructions on a processor of the mobile communication device that determines whether a customization package already exists on the mobile communication device at initial setup of the mobile communication device and if no customization package exists on the mobile communication device, selecting a customization package based on predefined rules and downloading the selected customization package to a memory of the mobile communication device. The method further comprises finding the relevant components in the customization package, installing the relevant components in the memory, and utilizing the relevant components.

In an embodiment, a method of delivering oversized branding elements for customization on a mobile communication device is disclosed. The method comprises examining the mobile equipment identifier (MEID) of the mobile communication device to determine the model of the mobile communication device and the original equipment manufacturer, determining the brand and the subsidy status of the mobile communication device, examining user characteristics of the mobile communication device based on relevant factors, and executing instructions on a processor of the mobile communication device that determines whether a customization package already exists on the mobile communication device at the time of initial setup. The method further comprises if no customization package exists on the mobile communication device, selecting a customization package from a pool of customization packages on a database based on predefined rules. The method further comprises installing the selected customization package including visual elements to the mobile communication device and utilizing visual elements.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
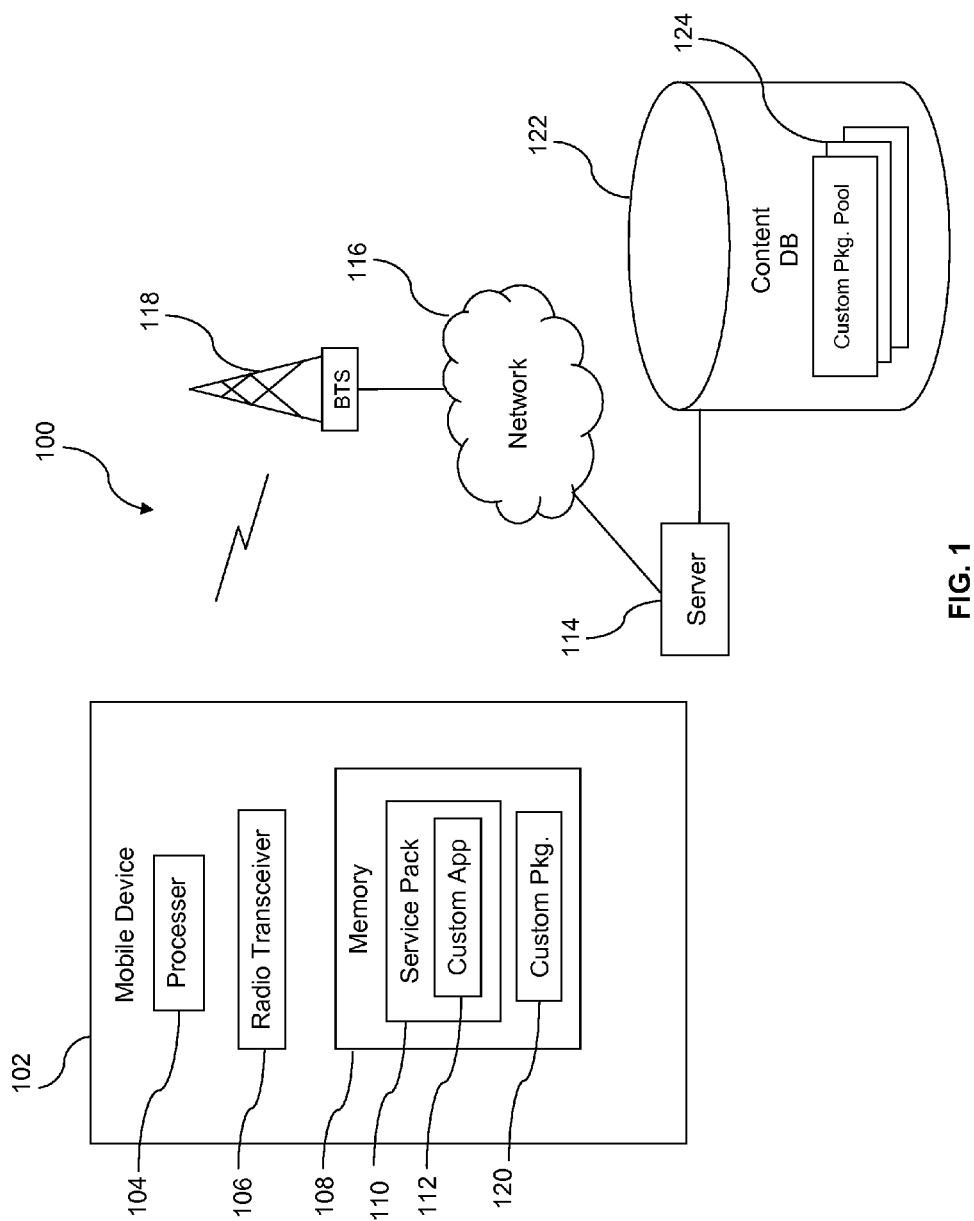
FIG. 1 is an illustration of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Existing software customization for mobile communication devices, such as cellular telephones and smartphones, may be conducted on a one time basis in large groups at the time of manufacturing or activation. Unique device customizations in a timely manner for different types of mobile communication devices, for example different models, brands, colors, and/or other features of mobile communication devices may not have been implemented on existing customization frameworks for mobile communication devices. Further change of customization packages or branding elements on mobile communication devices may not have been implemented on existing customization frameworks for mobile communication devices, either. Additionally, delivering oversized customization components, for example oversized visual elements such as wallpapers and animations, may be problematic. This can be caused by the big payload of the oversized customization elements and technique limitations of activation channels for mobile communication devices.

Disclosed herein is a method for delivering customization elements on different levels for mobile communication devices, including oversized branding elements for customization. In an embodiment, a customization application on a mobile communication device may examine whether a customization package exists already on the mobile communication device at initial setup. When no customization package is detected on the mobile communication device, the customization application may select a customization package from a pool of customization packages on a server based on predefined rules. The server may send a message or notification to the customization application to change the rules for selecting the customization package or components before any customization package is selected. Once the customization package or components are selected, the customization application may download the selected customization package or components and store the selected customization package or components to a memory on the mobile communication device. The customization package may be delivered over the top, meaning the delivery of the customization package may not depend on the components that are already on the mobile communication device. Oversized customization components may be downloaded through a side path instead of the activation channels for the mobile communication device. The customization application may then locate the relevant components from the stored customization package and install the relevant components in the memory. The customization application or other corresponding applications may utilize the relevant customization components. For example, device skins may be selected based on user characteristics and preloaded on the mobile communication device. More similar skins may be recommended to the user for purchase with a discount.

Turning now to FIG. 1, a communication system 100 is described. In an embodiment, the system 100 comprises a plurality of mobile communication devices 102. The mobile communication device 102 may comprise a processor 104, a radio transceiver 106, and a memory 108. A service pack 110 may be stored in the memory 108. The service pack 110 may comprise a customization application 112. The device 102 is configured to use the radio transceiver 106 to establish a wireless communication link with a base transceiver station (BTS) 118, and the base transceiver station 118 provides communications connectivity of the device 102 to a network 116. One or more servers 114 may also have access to the network 116. The network 116 may comprise any combination of private and public networks.

It should be noted that the server 114 may also reside in a distribution center or warehouse, and that some or all customization process of the mobile communication device 102 may be completed in the distribution center. This would allow customization to be accomplished prior to sending a plurality of mobile communication devices 102 to a retail point of sale or a large enterprise customer, for example.

The server 114 may also be coupled to a content database 122. The server 114 and the content database 122 may be located in one computer—for example, a server computer, in two different computers—for example, a server computer for the server 114, and another computer for the content database 122, in multiple different computers—for example, multiple server computers for the server 114, and other multiple computers for the content database 122, or in some other combination of computers. The content database 122 stores a pool of the customization packages 120, customization package pool 124. When the customization application 112 detects no customization package 120 on the mobile communication device 102, the customization application 112 may download a customization package 120 from the customization package pool on the content database 122.

It is understood that the system 100 may comprise any number of mobile communication devices 102 and any number of base transceiver stations 118. The collectivity of base transceiver stations 118 may be said to comprise a radio access network, in that these base transceiver stations 118 may provide a radio communication link to the mobile communication devices 102 to provide access to the network 116. The radio access network may be abstracted in different ways and may comprise, in addition to the base transceiver stations 118, servers and data stores such as home location registers (HLRs) or servers that implement the functionality of home location registers, visitor location registers (VLRs) or servers that implement the functionality of visitor location registers, base station controllers (BSCs), mobile switching centers (MSCs), and other network nodes that are specifically associated with providing wireless access and connectivity to the mobile communication devices 102.

The radio transceiver 106 may communicate with the base transceiver station 118 using any of a variety of wireless communication protocols including a code division multiple access (CDMA) wireless communication protocol, a global system for mobile communication (GSM) wireless communication protocol, a long-term evolution (LTE) wireless communication protocol, a world-wide interoperability for microwave access (WiMAX) wireless communication protocol, or another wireless communication protocol. The device 102 may be any of a mobile phone, a personal digital assistant (PDA), a media player, a wireless enabled computer, or another mobile communication device. In an embodiment, the mobile communication device 102 may have other components (not shown) such as a near field communication (NFC) radio transceiver, a wireless local area network (WLAN) radio transceiver, or other components.

In an embodiment, the customization package 120 may be a resource package that comprises customization resources such as brand configuration resources, brand experience resources, or other branding or customization resources. In an embodiment, a brand may refer to the wireless communication service provider or the mobile communication device 102 brand. The brand configuration may comprise operator name, network values, or other brand configuration information. For example, when a mobile communication device 102 is turned on for the first time at the user side, the mobile communication device 102 may register with a service provider to be able to connect to a radio access network. The information of the service provider that the mobile communication device 102 may register with may be stored in the mobile communication device 102 as part of the brand configuration. The brand configuration may further include a link or reference to a customer care center to facilitate user calls to care to obtain assistance in the case of communication problems. The brand configuration may further include pre-loaded or default applications associated with the subject brand. The brand experience may comprise visual elements, audio elements, widgets, and/or branded applications. The visual elements may comprise wallpapers/skins, interface controls, system startup visual effect, system turn off visual effect, videos, animations, or other visual content targeted for the mobile communication device 102.

For example, a skin of a mobile communication device 102 may refer to the background picture of the home page(s) of the mobile communication device 102. In an embodiment, the skins may be selected based on various related factors. For example, the skins may be selected based on the model of the mobile communication device 102, accessories such as the physical cover purchased with the mobile communication device 102, and/or software applications purchased with the mobile communication device 102. For example, a skin with a cartoon character may be selected to match a purchased hard cover with the same cartoon character. Some skins may be downloaded based on related factors and installed into the mobile communication device 102 by the customization application 112 along with the other customization components. More similar skins may be displayed and recommended to the user for purchase with a discount.

The audio elements may comprise ring tones, ringback tones, alerting tones, message tones, device startup tones, device turn off tones, or other audio content targeted for the mobile communication device 102. A branded application may differ from another branded application in both appearance, or so-called look and feel, and features/functions. For example, a branded application with a first brand may have the first brand name within or next to the application name as the application logo and may also have some functions specific to the first brand. The different version of the first branded application, a second branded application from a second brand may have the second brand name within or next to the application name as the application logo and may also have some functions specific to the second brand different from the functions of the first branded application that are specific to the first brand.

The customization package 120 may be selected in its entirety. Alternatively, the customization package 120 may be selected partially. For example, in an embodiment, the customization components in a customization package 120 may be indexed. Customization components from different customization packages 120 may be selected and downloaded based on their index numbers besides a customization package 120 or in place of a customization package 120. For example, a customization package may be selected by the customization application 112 and downloaded in its entirety for the mobile communication devices 102 that a big enterprise purchases for the employees. As another example, the customization application 112 on a different mobile communication device 102 may select different customization components from different customization packages based on predefined rules. When the customization application 112 finds customization component(s) missing that are desired, the customization application 112 may download the desired customization component(s) from the customization package pool 124 based on the index(es). The customization application 112 may locate the desired customization components from different customization packages with the index numbers of the customization components.

Please note that in an embodiment, the delivery of the customization package 120 may not entail any original equipment manufacturer (OEM) integration. Additionally, the delivery of the customization package 120 may not be implemented with the open mobile alliance (OMA) device management (DM). Alternatively, in an embodiment, the customization package 120 is delivered by the customization application 112 locally on the mobile communication device 102.

In an embodiment, the customization application 112 may be a component of the service pack 110. The service pack 110 may be a software package that comprises updates, repairs, or enhancements to a software application or operating system. The service pack 110 may refer to a software package that comprises updates, repairs, or enhancements to the operating system of the mobile communication device 102 herein. When executed by the processor 104 at various stages of the mobile communication device, for example at the point of sale, at the point of activation, or at the point of initial setup, the customization application 112 may determine whether a customization package 120 exists on the mobile communication device 102. If no customization package 120 is detected, the customization application 112 may select a customization package 120 from a customization package pool 124 on a content database 122 based on predefined rules.

For example, a customization package 120 may be selected on an individual level. For example, some characteristics of a user may be examined for the customization package 120 selection. For instance, identifying information such as the mobile equipment identifier (MEID) of the mobile communication device 102 may be examined to determine the model of the mobile communication device 102. The original equipment manufacturer may be determined based on the mobile equipment identifier of the mobile communication device 102. The wireless communications service provider or the carrier may also be determined in various ways. The subsidy status of the mobile communication device 102 may be determined based on identifying information such as the phone number and/or the wireless communications service provider information. The language association may also be examined and determined. The location of the mobile communication device 102 may be examined and determined. Additionally, a credit card number of the user of the mobile communication device 102, the purchasing history of the credit card, or other user characteristics may be determined. All the above information may be exploited to select the customization package 120 or customization components. For example, if the language association is determined to be Chinese, a customization package 120 in Chinese may be selected. If the mobile communication device 102 is detected to be in Germany, a customization package 120 in German may be selected.

A customization package 120 may be selected on a group level. For example, a specific customization package 120 may be selected and delivered to mobile communication devices 102 purchased by an enterprise for its employees. In other words, the enterprise may mandate to its employees that the customization package 120 be selected and delivered on these mobile communication devices 102 that the enterprise has purchased for the use of its employees. Additionally, a customization package 120 may be selected on a device model level, or some other predefined rules. For example, when the model of the mobile communication device 102 is determined based on the identifying information, the specific customization package 120 for the model may be selected and delivered to the mobile communication device 102.

The mobile communication device 102 may be examined on a combination of different levels, for example the individual level, the group level, the device model level, and/or with other relevant rules, to select a customization package 120 or customization components. For example, user characteristics of a mobile communication device 102 may be examined for selecting customization components. When customization components are selected, the customization application 112 may finish selecting customization components and start downloading the selected customization components. Alternatively, the customization application 112 may continue selecting more customization components based on more predefined rules. For instance, the mobile communication device 102 may then be examined to decide whether the mobile communication device 102 belongs to a group of mobile communication devices 102 purchased by an enterprise for its employees. If the mobile communication device 102 is determined to belong to the group of mobile communication devices 102 purchased by the enterprise for the employees, more customization components may be selected based on a mandate of a customization package for employees from the enterprise. Again, the customization application 112 may finish selecting customization components and start downloading the newly selected customization components. Alternatively, the customization application 112 may continue selecting more customization components based on additional predefined rules. For example, additional customization components or a customization package may be selected based on a device model level, or some other predefined rules.

Different customization packages 120 may be selected at different times even for the same model of mobile communication device 102. For example, the wireless communication service provider may select and install different branding applications for different promotion periods. For example, a device may be installed with college football themed applications at the college football season and may be installed with the national association for stock car auto racing (NASCAR) themed applications at the national association for stock car auto racing season.

The customization application 112 may download the selected customization package 120 through any available communication link. For example, the customization application 112 may download the customization package 120 through wired communication links. For example, the customization application 112 may download the selected customization package 120 through a dial up link, a digital subscriber line (DSL), a cable internet link, or another wired communication link. The customization application 112 may download the selected customization package 120 through wireless communication links. For example, the customization application 112 may download the customization package 120 through a long-term evolution link, a world-wide interoperability for microwave access link, a wireless local area network link, or another wireless communication link. In an embodiment, the customization application 112 may download the selected customization package 120 or customization components through a selected communication link available at the time. For example, the customization application 112 may download the first half of the selected customization package 120 or customization components through the communication link at the time, which may be a wireless communication link, and the second half through the communication link at the time, which may be a wired communication link. As another example, the customization application 112 may download the first 30% of the selected customization package 120 or customization components through the communication link at the time, which may be a digital subscriber line, the next 20% through the communication link at the time, which may be a long-term evolution link, and the rest of the 50% through the communication link at the time, which may be a cable internet link.

Usually some customization components are oversized for normal channels, for example activation channels, of the mobile communication device 102. For example, visual elements, like wallpapers, and branded applications may be oversized for activation channels of mobile communication devices 102 and may not be able to be delivered through the activation channels in current mobile communication device activation systems. In an embodiment, the oversized items are broken down into segments/portions/pieces, and at least some of the segments/portions/pieces may be delivered through a side path instead of the activation channel. For instance, the oversized items may be broken into segments/portions/pieces and the segments/portions/pieces are transmitted through the side path. Alternatively, the oversized items may be broken into segments/portions/pieces, and some segments/portions/pieces may be transmitted quickly through normal channels. The remaining segments/portions/pieces, which might be larger in size, may be transmitted through the side path. The side path may be any available communication channel other than the normal communication channels and/or the activation channel.

For example, a multi-antenna mobile communication device 102 may assign a non-interfering channel as the side path besides the activation channel to communicate with the server 114 that also has multiple antennas to transmit the segments/portions/pieces broken from the oversized customization components. As another example, oversized customization components may be broken into pieces, and the mobile communication device 102 may download from the server 114 some of the pieces broken from the oversized customization components through the activation channel. The activation channel between the mobile communication device 102 and the server 114 may be a wireless communication link. The remaining pieces broken from the oversized customization components may be downloaded by the mobile communication device 102 from the server 114 through a wired communication link other than the wireless activation channel between the mobile communication device 102 and the server 114. The process of delivering the customization package 120 may be conducted in the background without user interruption or interaction. In other words, the process of delivering the customization package 120 may be conducted in a transparent manner without affecting the user behavior and operations on the device.

In an embodiment, when the downloading is not finished, the customization application 112 may automatically restart the process of downloading the customization package 120 through the selected available communication link after the process pauses/stops/halts. For example, the customization application 112 may pick up from the point where the process stopped/paused/halted and download the rest of the customization package 120 from the point. In other words, the customization application 112 may not restart downloading from the beginning of the customization package 120 as some of the current device management software might do. By downloading from the point where the process of downloading stopped/paused/halted last time, the process may not waste time or network bandwidth on downloading duplicate contents, and so the user experience may be satisfactory regarding the speed of the mobile communication device 102.

The process of delivering the customization package 120 may be accomplished by the end of the initial setup of the mobile communication device 102. For example, a popular social network application, as part of a customization package 120, may be downloaded, installed, and configured by the end of the initial setup of the mobile communication device 102 under predefined circumstances. When the user uses the mobile communication device 102 for the first time after the initial setup, the preinstalled and configured social network application may be accessed by the user without downloading or configuring which may introduce evident delay.

The customization application 112 may store the customization package 120 into the memory 108 of the mobile communication device 102. The customization application 112 may then find the relevant customization components from the customization package 120 and install the relevant components in the memory. Corresponding applications, for example the customization application 112, applications from the operating system of the mobile communication device 102, or both, may utilize the relevant customization components in place. For example, the customization application 112 may put skin data into a folder or directory in the mobile communication device 102 that stores all skin data of the mobile communication device 102. The application that applies skins for the mobile communication device 102 may fetch the skin data from the skin folder and apply the selected skin under predefined circumstances. Alternatively, the customization application 112 may also utilize the relevant customization components from the customization package 120. For example, the customization application 112 may read flags and/or parameters in the customization package and make corresponding settings on the mobile communication device 102.

Figure 2:
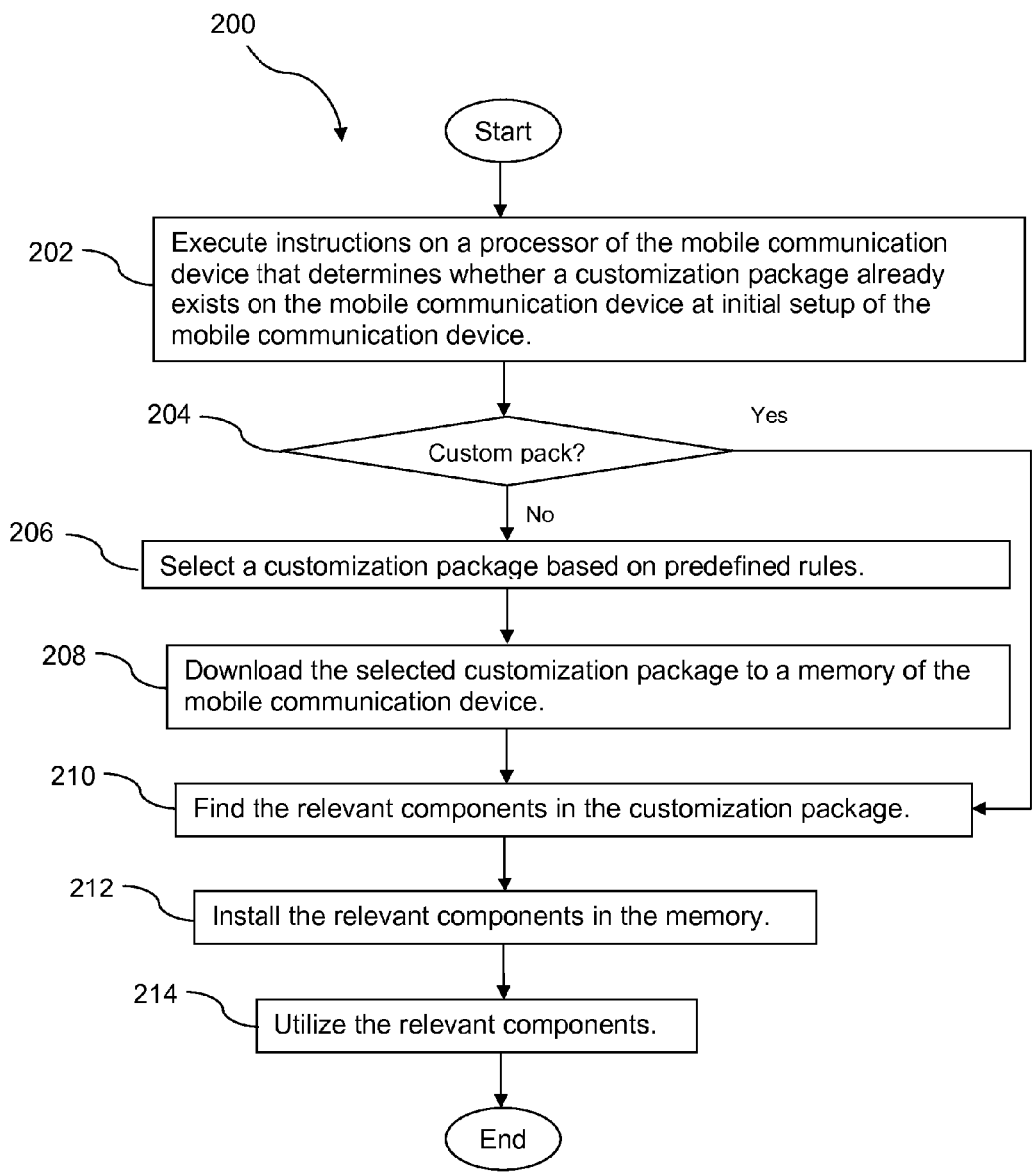
FIG. 2 is a flow chart illustrating a method according to an embodiment of the disclosure.

Turning now to FIG. 2, a method 200 is described. At block 202, instructions are executed on a processor of the mobile communication device that determines whether a customization package already exists on the mobile communication device at initial setup of the mobile communication device. At block 204, it is determined whether a customization package exists on the mobile communication device 102. If no customization package is detected on the mobile communication device 102, the method 200 proceeds to block 206. At block 206, the customization package is selected based on predefined rules. When no customization package or component is detected on the mobile communication device, a customization application on the mobile communication device may select a customization package or customization components from a pool of customization packages on a service server 114 of the mobile communication device 102, as shown in FIG. 1. The selection of the customization package or customization components may be based on predefined rules. At block 208, the selected customization package is downloaded to a memory of the mobile communication device.

After block 208, the method 200 proceeds to block 210. On the other hand, if a customization package is detected on the mobile communication device at block 204, the method 200 also proceeds to block 210. At block 210, the relevant components in the customization package are found. The customization application may locate the relevant customization components in the memory of the mobile communication device for further action. At block 212, the relevant components are installed in the memory. For example, ringtone data from the customization package may be put by the customization application in a folder that stores all ringtone data on the mobile communication device. At block 214, the relevant components are utilized. The relevant customization components are utilized either by the customization application or other corresponding applications.

Figure 3:
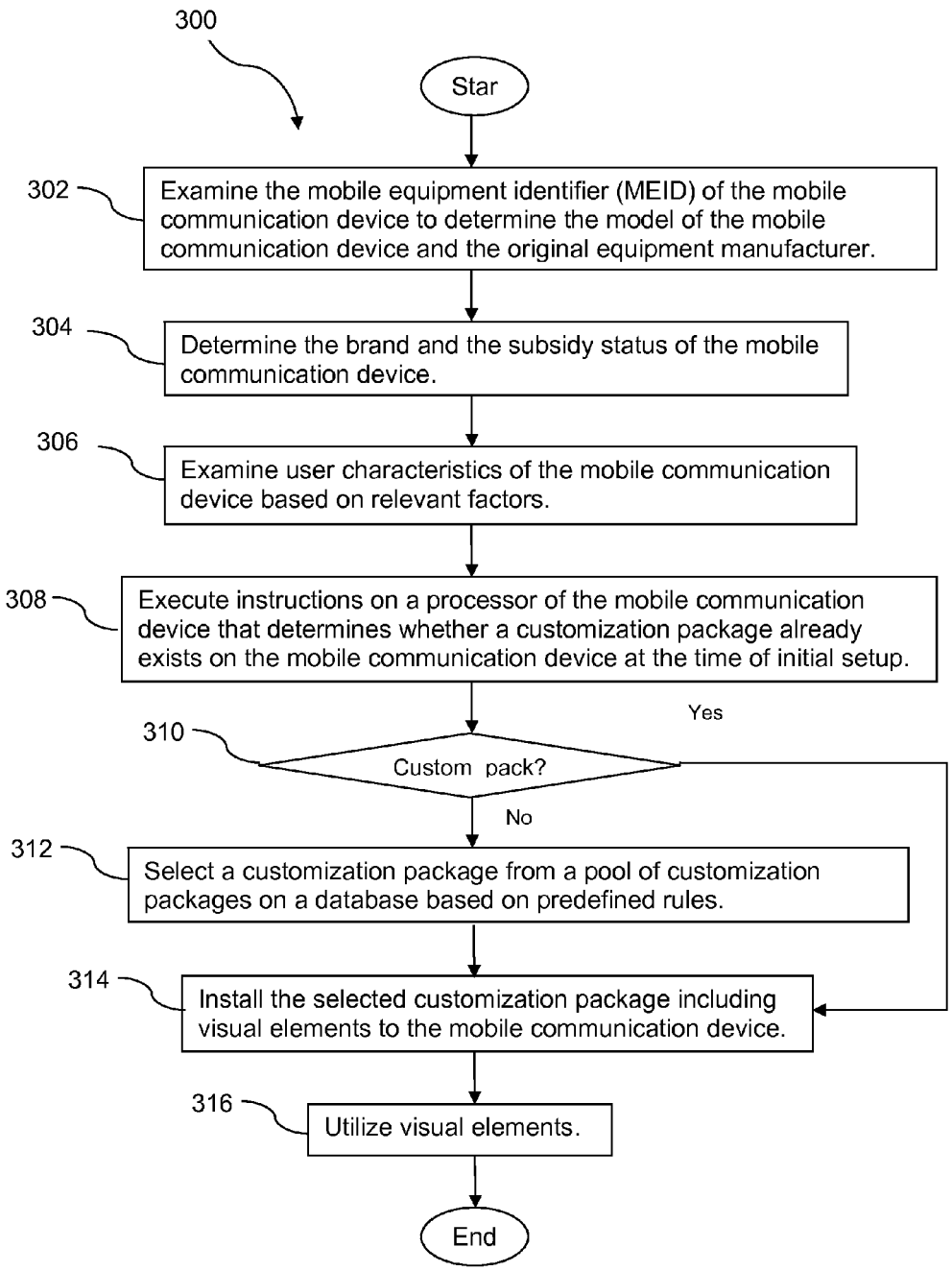
FIG. 3 is a flow chart illustrating another method according to an embodiment of the disclosure.

Turning now to FIG. 3, a method 300 is described. At block 302, the mobile equipment identifier (MEID) of the mobile communication device is examined to determine the model of the mobile communication device and the original equipment manufacturer. The mobile equipment identifier is a standardized globally unique identification number for a physical piece of mobile equipment. In an embodiment, the mobile equipment identifier is composed mainly of two components, the manufacturer code and the serial number. With a request message from a server, a mobile communication device may send the mobile equipment identifier information to the server. The server may identify the device model and the original equipment manufacturer of the mobile communication device with the mobile equipment identifier. The mobile communication device may register with the proper server with the above identifying information.

At block 304, the brand and the subsidy status of the mobile communication device are determined. Here the brand may refer to the wireless communication service provider or the carrier. When the mobile communication device registers with the server, a customization application on the mobile communication device may determine the brand and receive information regarding the subsidy status of the mobile communication device from the server. The subsidy status of the mobile communication device may affect the selection of the customization package. For example, if a mobile communication device is determined to be a subsidized device, a customization package that comprises advertisement components may be selected.

At block 306, user characteristics of the mobile communication device are examined based on relevant factors. For example, some user characteristics may be examined in order for the customization application to determine on which customization package or customization components to select. In an embodiment, the customization application may examine the physical cover and/or software applications already purchased by the user of the mobile communication device to decide on the skin to download as part of a customization package or along with other customization components. At block 308, instructions are executed on a processor of the mobile communication device that determines whether a customization package already exists on the mobile communication device at the time of initial setup. At block 310, it is determined whether a customization package exists on the mobile communication device.

If no customization package is detected on the mobile communication device 102, the method 300 proceeds to block 312. At block 312, the customization package is selected from a pool of customization packages on a database based on predefined rules. After block 312, the method 300 also proceeds to block 314. On the other hand, if a customization package is detected on the mobile communication device 102, which means the result of block 310 is positive, the method 300 proceeds to block 314 directly. At block 314, the selected customization package is installed including visual elements to the mobile communication device. At block 316, visual elements are utilized.

Figure 4:
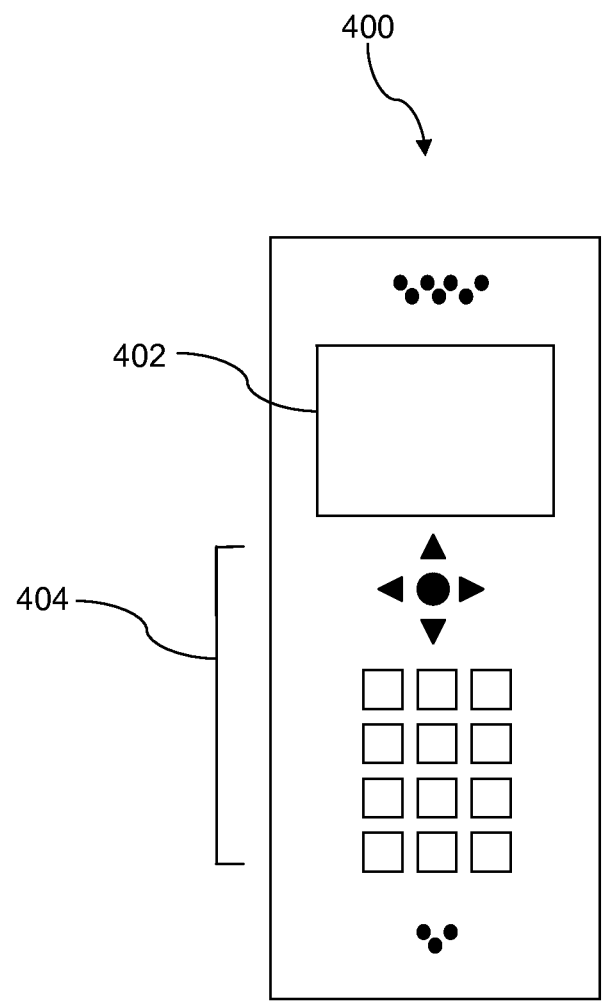
FIG. 4 is an illustration of a mobile communication device according to an embodiment of the disclosure.

FIG. 4 depicts the mobile device 400, which is operable for implementing aspects of the present disclosure, but the present disclosure should not be limited to these implementations. Though illustrated as a mobile phone, the mobile device 400 may take various forms including a wireless handset, a pager, a personal digital assistant (PDA), a gaming device, or a media player. The mobile device 400 includes a display 402 and a touch-sensitive surface and/or keys 404 for input by a user. The mobile device 400 may present options for the user to select, controls for the user to actuate, and/or cursors or other indicators for the user to direct. The mobile device 400 may further accept data entry from the user, including numbers to dial or various parameter values for configuring the operation of the handset. The mobile device 400 may further execute one or more software or firmware applications in response to user commands. These applications may configure the mobile device 400 to perform various customized functions in response to user interaction. Additionally, the mobile device 400 may be programmed and/or configured over-the-air, for example from a wireless base station, a wireless access point, or a peer mobile device 400. The mobile device 400 may execute a web browser application which enables the display 402 to show a web page. The web page may be obtained via wireless communications with a base transceiver station, a wireless network access node, a peer mobile device 400 or any other wireless communication network or system.

Figure 5:
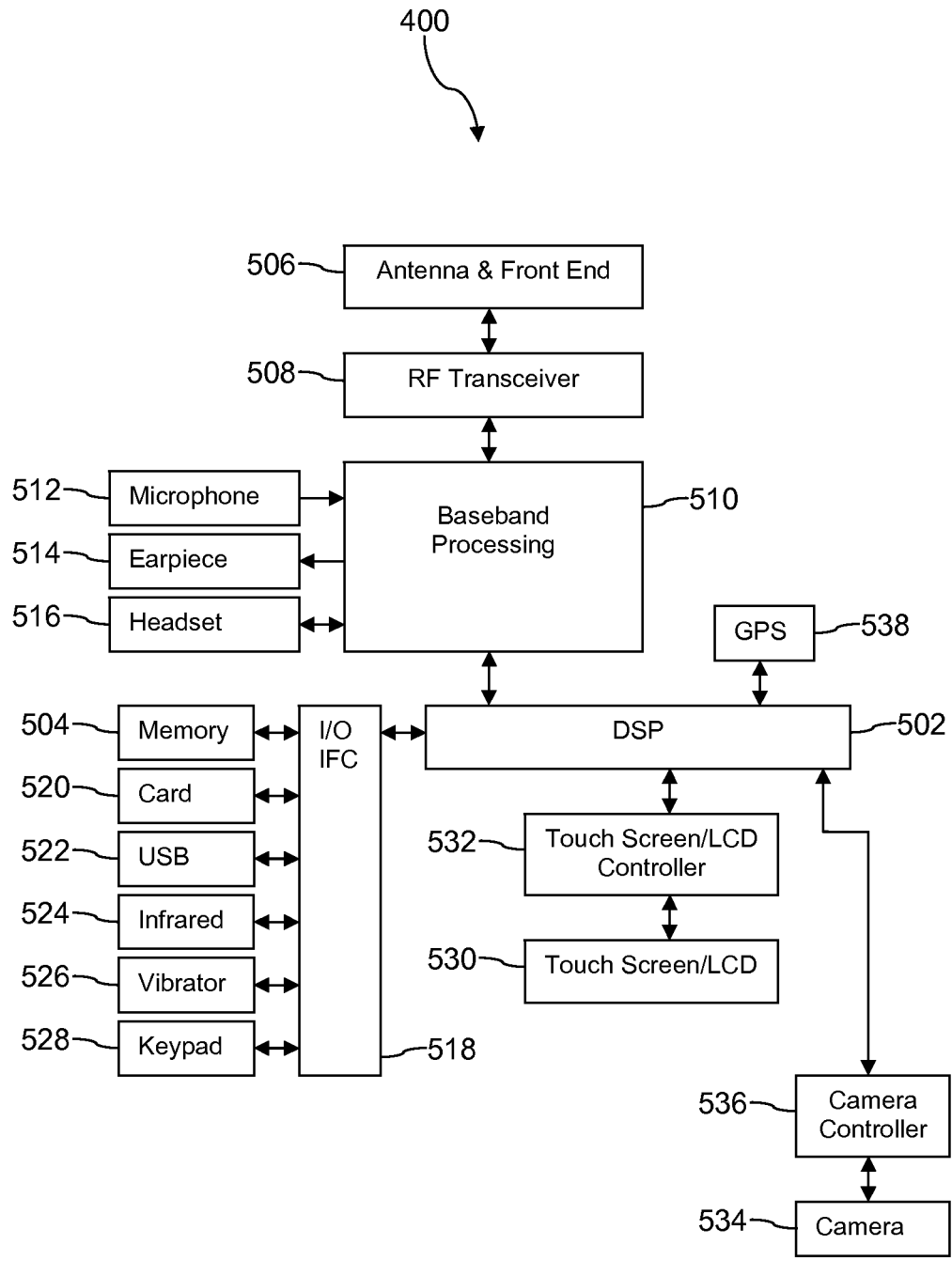
FIG. 5 is a block diagram of a mobile communication device according to an embodiment of the disclosure.

FIG. 5 shows a block diagram of the mobile device 400. While a variety of known components of handsets are depicted, in an embodiment a subset of the listed components and/or additional components not listed may be included in the mobile device 400. The mobile device 400 includes a digital signal processor (DSP) 502 and a memory 504. As shown, the mobile device 400 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a camera 534, a camera controller 536, and a global positioning system (GPS) receiver 538. In an embodiment, the mobile device 400 may include another kind of display that does not provide a touch sensitive screen. In an embodiment, the DSP 502 may communicate directly with the memory 504 without passing through the input/output interface 518. Additionally, in an embodiment, the mobile device 400 may comprise other peripheral devices that provide other functionality.

The DSP 502 or some other form of controller or central processing unit operates to control the various components of the mobile device 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the mobile device 400 to function as a peripheral device to exchange information with a personal computer or other computer system. The infrared port 524 and other optional ports such as a Bluetooth® interface or an IEEE 802.11 compliant wireless interface may enable the mobile device 400 to communicate wirelessly with other nearby handsets and/or wireless base stations.

The keypad 528 couples to the DSP 502 via the input/output interface 518 to provide one mechanism for the user to make selections, enter information, and otherwise provide input to the mobile device 400. Another input mechanism may be the touch screen LCD 530, which may also display text and/or graphics to the user. The touch screen LCD controller 532 couples the DSP 502 to the touch screen LCD 530. The GPS receiver 538 is coupled to the DSP 502 to decode global positioning system signals, thereby enabling the mobile device 400 to determine its position.

Figure 6A:
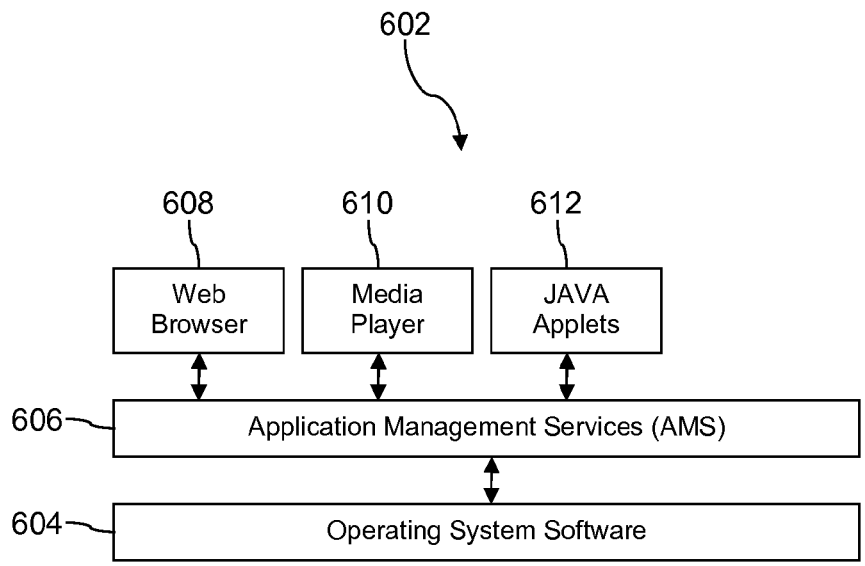
FIG. 6A is a block diagram of a software architecture of a mobile communication device according to an embodiment of the disclosure.

FIG. 6A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the mobile device 400. Also shown in FIG. 6A are a web browser application 608, a media player application 610, and JAVA applets 612. The web browser application 608 may be executed by the mobile device 400 to browse content and/or the Internet, for example when the mobile device 400 is coupled to a network via a wireless link. The web browser application 608 may permit a user to enter information into forms and select links to retrieve and view web pages. The media player application 610 may be executed by the mobile device 400 to play audio or audiovisual media. The JAVA applets 612 may be executed by the mobile device 400 to provide a variety of functionality including games, utilities, and other functionality.

Figure 6B:
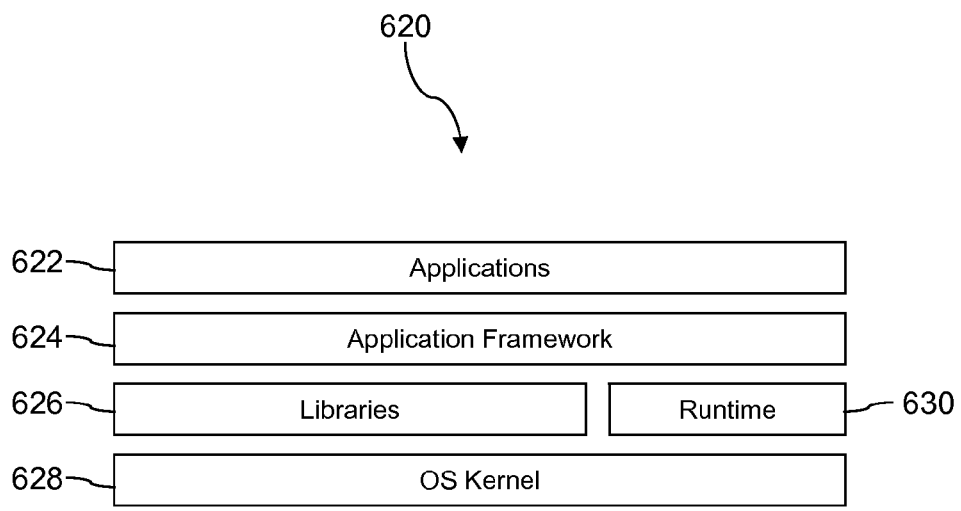
FIG. 6B is a block diagram of another software architecture of a mobile communication device according to an embodiment of the disclosure.

FIG. 6B illustrates an alternative software environment 620 that may be implemented by the DSP 502. The DSP 502 executes operating system kernel (OS kernel) 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 7:
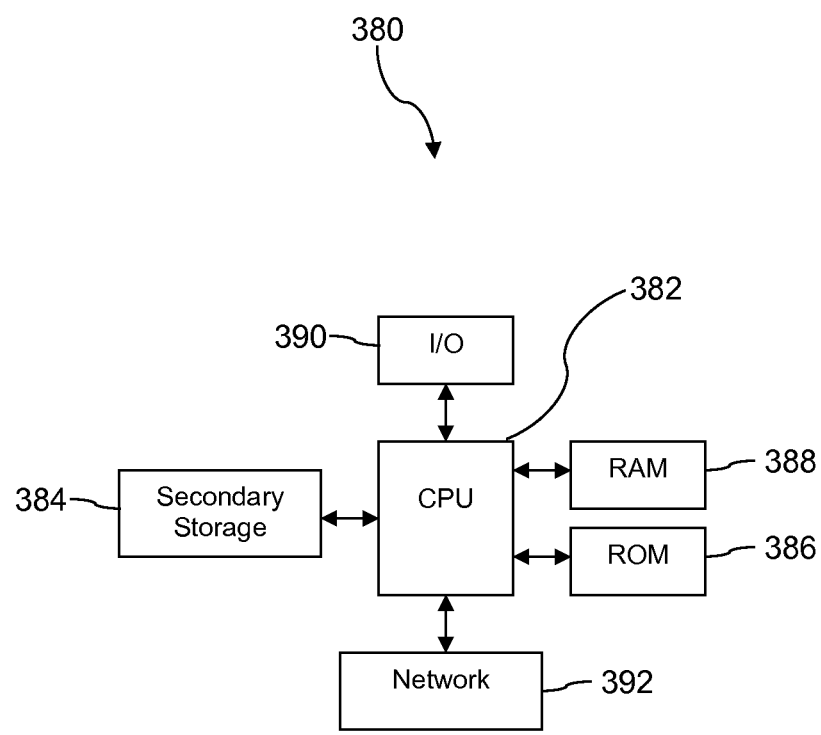
FIG. 7 is a block diagram of a computer system according to an embodiment of the disclosure.

FIG. 7 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A mobile communication device, comprising:
a radio transceiver to communicatively couple the mobile communication device to a radio access network by a wireless communication link;
a non-transitory memory;
a processor;
a service pack; and
an application, as a component of the service pack, stored in the non-transitory memory and executed on the processor, that, upon starting an initial network setup of the mobile communication device via an activation channel of the wireless communication link to the radio access network:
determines whether a customization package exists on the mobile communication device,
in response to a determination that no customization package is present on the mobile communication device:
selects, based on predefined rules, a customization package from a pool of customization packages on a network server,
based on the customization package selected, determines that a size of the customization package exceeds a threshold associated with a capacity of the activation channel, and
responsive to the determination that the size exceeds the threshold, downloads at least part of the selected customization package to the mobile communication device through an alternative communication link other than the activation channel, wherein the download via the alternative communication link does not implement open mobile alliance device management protocol, and wherein the customization package is downloaded before completion of the initial network setup of the mobile communication device,
finds relevant components in the customization package,
installs the relevant components in the memory, and
utilizes the relevant components.

2. The mobile communication device of claim 1, wherein the customization package is selected based on a credit card number associated with a user of the mobile communication device and a mobile equipment identifier of the mobile communication device.

3. The mobile communication device of claim 1, wherein the customization package is selected based on a model of the mobile communication device.

4. The mobile communication device of claim 1, wherein the customization package is selected based on a mandate of a customization package for employees of a company.

5. The mobile communication device of claim 1, wherein the customization package comprises brand configuration and brand experience.

6. The mobile communication device of claim 5, wherein the brand experience comprises wallpapers and branded applications.

7. The mobile communication device of claim 6, wherein the branded applications differ from applications for other brands in appearance and/or features.

8. A method of delivering oversized branding elements for customization on a mobile communication device, comprising:
in response to starting an initial network setup of the mobile communication device via an activation channel of a wireless communication link to a radio access network, determining, by an application stored in a non-transitory memory of the mobile communication device and executed on a processor of the mobile communication device, whether a customization package already exists on the mobile communication device;
in response to determining that no customization package exists on the mobile communication device:
selecting, by the application based on predefined rules, a customization package from a pool of customization packages,
based on selecting the customization package, determining that a size of the customization package exceeds a threshold associated with a capacity of the activation channel, and
responsive to the determination that the size exceeds the threshold, downloading, by the application, at least part of the selected customization package to a non-transitory memory of the mobile communication device through an alternative communication link other than the activation channel, wherein downloading via the alternative communication link does not implement open mobile alliance device management protocol, and wherein the customization package is downloaded before completion of the initial network setup of the mobile communication device;
finding relevant components in the customization package;
installing the relevant components in the memory; and
utilizing the relevant components.

9. The method of claim 8, wherein the customization package downloaded to the mobile communication device comprises brand experience and brand configuration, which comprises operator name and network values.

10. The method of claim 9, wherein the brand experience comprises brand experience elements including wallpapers and branded application, wherein a size of the brand experience elements exceeds the threshold associated with the capacity of the activation channel, and wherein a payload of the brand experience elements is broken down into segments and delivered through a side path that is not the activation channel.

11. The method of claim 8, wherein the customization package is selected based on a model of the mobile communication device, a mobile equipment identifier, a wireless communication services provider, or a language association.

12. The method of claim 8, wherein the customization package is downloaded over the alternative communication link without interruption of a user associated with the mobile communication device.

13. A method of delivering oversized branding elements for customization on a mobile communication device, comprising:
examining the mobile equipment identifier (MEID) of the mobile communication device to determine a model of the mobile communication device and an original equipment manufacturer;
determining a brand of the mobile communication device and a subsidy status of the mobile communication device;
examining a purchase history associated with the mobile communication device;
in response to starting an initial network setup of the mobile communication device via an activation channel of a wireless communication link to a radio access network, determining, by an application stored in a non-transitory memory of the mobile communication device and executed on a processor of the mobile communication device, whether a customization package already exists on the mobile communication device;
in response to determining that no customization package exists on the mobile communication device:
selecting, by the application from a pool of customization packages on a database, a customization package based on predefined rules, the brand, the subsidy status, and the purchase history associated with the mobile communication device, wherein the customization package comprises visual elements, and
downloading, by the application, at least part of the selected customization package to the mobile communication device through an alternative communication link other than the activation channel, wherein the download via the alternative communication link does not implement open mobile alliance device management protocol, and wherein the customization package is downloaded before completion of the initial network setup of the mobile communication device;
installing the selected customization package to the mobile communication device; and
utilizing, based on installation of the customization package, visual elements on the mobile communication device.

14. The method of claim 13, further comprising:
prior to installing the selected customization package, determining, by executing the application, that download of the selected customization stopped, and
automatically resuming, by executing the application, download of the selected customization package where the download of the selected customization package stopped.

15. The method of claim 13, wherein visual elements of the selected customization package comprise skin data and a themed application that correspond with a physical cover of the mobile communication device.

16. The method of claim 15, wherein the skin data is included as a visual element with the selected customization package based on the purchase history, wherein the purchase history includes information about at least one of a model of the mobile communication device or accessories and applications purchased with the mobile communication device.

17. The method of claim 13, wherein the customization package comprises information that is indexed according to index numbers, and further comprising identifying, based on index numbers, that information is missing from the customization package, and downloading, by the application, the information that is missing from the customization package on the mobile communication device.

* * * * *